INVENTORS
WILLIAM JOHN GREENE
ARTHUR F. CLARKE, JR.
BY Leslie S. Byer
ATTORNEY

United States Patent Office 3,008,036
Patented Nov. 7, 1961

3,008,036
INITIATING AND STABILIZING WELDING
ARCS
William J. Greene, Scotch Plains, and Arthur F. Clarke, Jr., Cedar Grove, N.J., assignors to Air Reduction Company, Incorporated, New York, N.Y., a corporation of New York
Filed Nov. 13, 1959, Ser. No. 852,762
13 Claims. (Cl. 219—131)

This invention relates to a method and apparatus for initiating and stabilizing a welding arc supplied with alternating current and in particular to initiating and stabilizing an alternating current arc in a shielding gas between an electrode of thermionic material and a workpiece that is a poor emitter of electrons.

An alternating current arc is extinguished and the electrodes are repeatedly reversed in polarity on each half cycle as the arc current and the arc voltage are reversed. The principal problem in welding with this type of arc arises out of the necessity for reignition of the arc at each half cycle. Each time the arc is extinguished it must be readily reignited to provide a smooth regular arc if a usable welding process is to be achieved. The reignition of the arc is dependent upon cathode emission and ionization of the arc column to conduct the arc current which are attained by imposing a sufficient reignition voltage across the electrode and the workpiece.

It has been found that when a material which is a good thermionic electron emitter at its welding temperature (i.e., a thermionic material) acts as a welding arc cathode, it forms a very efficient cathode with a low cathode voltage drop. Such materials emit at their welding temperature, with a low cathode voltage drop, all the electrons needed by the arc. This effect is not present in the case of the relatively poor thermionic emitters or "cold cathode" materials, in which class fall most of the common structural materials such as aluminum, copper, nickel, iron, magnesium, titanium, etc., and alloys thereof normally welded commercially in large quantities. The electrode emission from "cold cathode materials" may be viewed from a simplified standpoint as being dependent principally upon "field emission." Such emission ceases abruptly each time the arc is extinguished or interrupted and requires a very high open circuit voltage sufficient to establish a glow discharge before the arc can be reignited. The reignition voltage comprises that voltage required to produce such glow discharge. The normal alternating low open circuit voltages of about 75 volts are not sufficient to supply the necessary reignition voltage and therefore will not sustain an inert gas shielded alternating current metal welding arc with such cold cathode materials. A thermionic material, on the other hand, continues to emit electrons copiously by virtue of its temperature. Thus with an alternating current source it continues to emit electrons even after the current to the arc is extinguished due to the thermal lag in the electrode. In this case easy reignition of the arc is possible at normal low open circuit voltages.

Thus in inert-gas tungsten arc welding where the electrode of tungsten is a good emitter of electrons and where the workpiece being welded is a poor emitter of electrons, for example, aluminum, difficulty may be encountered in restarting the arc during those half cycles when the workpiece is negative and is therefore required to emit electrons. In order to restart the arc on each such half cycle, it has been proposed to superimpose on the welding current a high frequency component at a high potential, to ionize the gap at the electrode, so that the welding arc can follow the ionized path broken down by the high voltage. The first restarting mechanism of this type applied the high frequency continuously during a welding operation. It was found that such high frequency starting mechanisms produced considerable interference with radio communications. For that reason, they have not been commercially acceptable in most instances. Attempts have been made to reduce the objectionable radio interference by supplying the high frequency only during the half cycles when the electrode is positive. Even in such systems, where the high frequency is supplied only one-half the time, it has been found that the radio interference is objectionable.

In accordance with the present invention, it is now proposed to minimize radio interference in such a system by providing the high frequency as a pulse of very short duration, e.g., of the order of a few microseconds. Under starting conditions, when the electrode is cold, the high frequency pulse is supplied concurrently with the peak of the half cycles when the electrode is positive. This arrangement takes advantage of the peak voltage supplied by the alternating current source to start the arc. After the arc has become established, and the welding operation is proceeding, it is preferred to supply the high frequency pulses concurrently with the leading edge of the half cycles during which the electrode is positive, in order that the weld may continue substantially continuously, without interruption at the times when the alternating current goes through zero.

An object of the invention is to provide an improved method and apparatus for initiating an alternating current welding arc by the use of high frequency pulses of short duration as compared to the duration of a half cycle of the alternating current.

Another object of the invention is to provide such a method and apparatus in which the high frequency pulse is supplied concurrently with the peaks of the alternating current during the half cycle when the electrode is positive, providing that the electrode is cold.

A further object is to provide a method and apparatus in accordance with the invention, wherein, after the arc has become established, the high frequency pulses are supplied concurrently with the leading edges of the half cycles during which the electrode is positive.

The foregoing and other objects of the invention are attained in the method and apparatus described herein. The apparatus includes a conventional low frequency alternating current welding generator having terminals respectively connected to a welding electrode and a workpiece or its support. A high frequency generator, also conventional, is connected across the welding electrode and the workpiece. Current for energizing the high frequency spark generator is supplied through a circuit controlled by a thyratron. The control electrode of the thyratron is supplied with a compound potential which is the sum of two of three component potentials. The first of these components is a constant bias potential derived from a power supply independent of the welding generator and having a polarity effective to maintain the thyratron non-conductive, i.e., to prevent the supply of energy from the spark energy supply means to the spark generator. The second component potential is derived from the low frequency generator and alternates with the output potential thereof, being effective to oppose the constant bias during the low frequency half cycles when the electrode is positive. The third component is a direct current potential derived from the welding generator through a rectifier and having a polarity tending to bias the control electrode against the release of energy from the spark energy supply means. This last component potential is greatest when the alternating potential at the electrode is greatest, which occurs at open circuit, when the electrode is cold. The various components are coordinated so that when the electrode is cold, the potential tending to hold the thyratron cut off may be overcome by the low frequency potential only at the peaks of the half cycles when the electrode is positive. Thus, advantage is taken of the peak alternating potential to start the arc.

After the arc is once initiated and the welding operation is proceeding, the potential between the welding electrode and the workpiece decreases substantially, due to the load of the arc. This decrease is reflected in the third component potential. The second component potential derived directly from the alternating current then becomes effective to turn on the high frequency supply substantially concurrently with the leading edge of the half cycle during which the electrode is positive.

When welding with an alternating current arc, the wave form of the alternating potential appearing between the electrode and the workpiece typically has sharp peaks at the leading edges of the half cycles when the electrode is positive. These sharp peaks help the operation of the system described above. However, the wave form may under certain circumstances present another sharp peak concurrent with the trailing edge of the positive electrode half cycles. Since it is not desired to supply a high frequency pulse at such times, means are provided for disabling the control electrode so that the thyratron cannot be turned on for a time somewhat greater than one-half cycle of the alternating current after a high frequency pulse has once been supplied.

The disabling means for preventing the control electrode from tripping the thyratron at such times comprises a neon lamp connected in series with a diode between the control electrode of the thyratron and ground. The potential at the anode of the diode is the potential at the control electrode. The potential at the cathode of the diode is supplied through a coupling capacitor from the thyratron anode-cathode circuit. The thyratron anode-cathode circuit is supplied by a storage capacitor which is charged through a time constant network from a rectified alternating current. This alternating current source may be the independent power supply mentioned above. The thyratron anode-cathode circuit also includes substantial inductance, so that when the storage capacitor discharges upon tripping of the thyratron, the potential across the capacitor swings substantially in a reverse direction. This reverse swing is transferred through the coupling capacitor to the neon lamp and is effective to unblock the diode and turn on the lamp. The diode and lamp then form an effective shunt between the control electrode of the thyratron and ground for any potential having a polarity in a sense effective to trip the thyratron.

Other objects and advantages of the invention will become apparent from a consideration of the following specification and claims taken together with the accompanying drawings.

Figure 1:
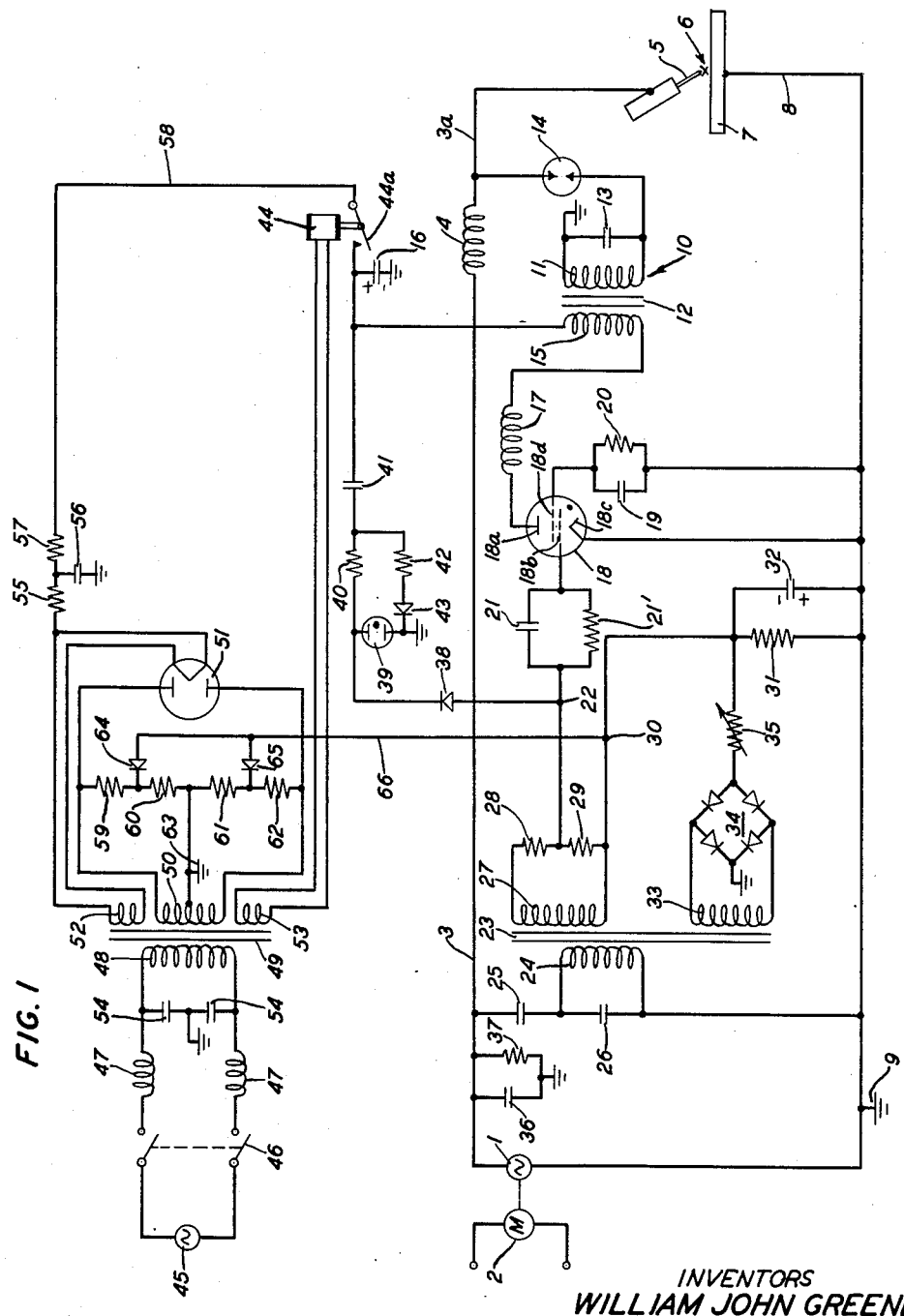
FIG. 1 is a wiring diagram of an arc welding apparatus embodying the invention.

Referring to FIG. 1, alternating current for welding is supplied by a generator 1 of conventional construction, driven by a motor 2, which may be supplied by any suitable source of energy. The welding current flows from the generator 1 through a wire 3 and a choke coil 4 to a welding electrode 5 and thence passes through a welding arc generally indicated at 6 to a workpiece 7, which is shown diagrammatically connected by means of a wire 8 to ground at 9. The opposite terminal of the generator 1 is also connected to ground.

A high frequency pulse spark generator is generally indicated at 10, and includes the secondary winding 11 of a transformer 12, and a capacitor 13 connected in parallel with the winding 11. One terminal of the secondary winding 11 is grounded, and the other terminal is connected through a sealed gap 14 to the wire 3a connected to the welding electrode 5. The gap 14 determines the magnitude of the spark producing voltage applied across the electrode 5 and the workpiece 7.

The transformer 12 has a primary winding 15 which is connected in a series circuit with a spark energy supply capacitor 16, an inductance 17, and the anode-cathode path through a thyratron 18 having an anode 18a, a control electrode 18b, a cathode 18c, and a screen grid 18d. Cathode 18c is grounded, and the lower terminal of capacitor 16, as it appears in the drawing, is grounded. Screen grid 18d is connected through a coupling capacitor 19 to ground. A resistor 20 is connected in parallel with capacitor 19 to prevent the building up of a charge on that capacitor. Control electrode 18b is connected through a coupling capacitor 21 to a junction 22. A discharging resistor 21' is connected in parallel with capacitor 21.

It will be noted that when thyratron 18 becomes conductive, the charge on capacitor 16 is transferred to capacitor 13 through transformer 12. When the voltage of capacitor 13 exceeds the breakdown potential of the spark gap 14, capacitor 13 discharges through 14 and across the gap between electrode 5 and the workpiece 7. Thus, the spark gap 14 acts as a switch to discharge capacitor 13 abruptly into the arc gap and the thyratron 18 can operate at lower current levels during discharge of capacitor 16 to charge capacitor 13 to the breakdown voltage of gap 14.

A transformer 23 has a primary winding 24 whose upper terminal is connected through a capacitor 25 to the ungrounded A.C. supply line 3. The lower terminal of primary winding 24 is connected to ground. A capacitor 26 is connected across the terminals of winding 24. Transformer 23 has a secondary winding 27 having two voltage divider resistors 28 and 29 connected in series across its terminals. Junction 22 is connected to the common terminal of resistors 28 and 29. The lower terminal of secondary winding 27 is connected to a junction 30, which is in turn connected through a resistor 31 and a parallel connected capacitor 32 to ground.

Transformer 23 has a second secondary winding 33 whose terminals are connected to the input terminals of a rectifier bridge generally indicated at 34. The output terminals of the rectifier bridge 34 are respectively connected to ground and through a variable resistor 35 to the junction 30 to supply a negative bias voltage thereto which rises and falls with the welder voltage.

A capacitor 36 is connected between supply line 3 and ground. A resistor 37 is connected in parallel with capacitor 36. The capacitors 25, 26 and 36 are high frequency by-pass capacitors. Resistor 37 is provided to prevent the building up of a charge on either capacitor 25 or 36.

A disabling circuit for the thyratron 18 may be traced from junction 22 through a diode 38 and a neon lamp 39 to ground.

The common terminal of diode 38 and neon lamp 39 is connected through a resistor 40 and a coupling capacitor 41 to the ungrounded terminal of the spark energy supply capacitor 16. A resistor 42 and a diode 43 are connected in series between ground and the common terminal of resistor 40 and capacitor 41.

A relay 44 having a time delay in closing its contact 44a controls a charging circuit for capacitor 16, which circuit is supplied with rectified alternating current from a suitable source of energy, generally indicated at 45, which should be independent of the source supplying the alternator 1. The source 45 is connected through a double-pole switch 46 and choke coils 47 to the opposite terminals of a primary winding 48 of a transformer 49. High-frequency by-pass condensers 54 connect the respective terminals of transformer winding 48 to ground.

Transformer 49 has a secondary winding 50 whose opposite terminals are connected to the anodes of a double diode 51. The transformer 49 has a second secondary winding 52 which supplies heating current to the cathode of the double diode 51, and to the heater circuit (not shown) for cathode 18c of thyratron 18, and a third secondary winding 53, which supplies the winding of relay 44. The delayed closing of contact 44a of relay 44 prevents charging of capacitor 16 until after sufficient time has elapsed for proper cathode heating of thyratron 18 to condition it for discharging capacitor 16.

The double diode 51 acts as a full wave rectifier. Its cathode is connected through a filter network comprising a resistor 55 and a capacitor 56 and through a charging resistor 57 to a wire 58 leading through the contact 44a of relay 44 to the ungrounded terminal of capacitor 16.

A voltage divider comprising four resistors 59, 60, 61 and 62 is connected across the terminals of secondary winding 50. The midpoint of this voltage divider is connected to a center tap on the winding 50 and to ground at 63. A pair of diodes 64 and 65 are connected between a wire 66 (which is in turn connected to junction 30) and the common terminals of the resistors 59, 60 and 61, 62. The diodes 64, 65 form a full wave rectifier for supplying a fixed negative biasing potential to the junction 30.

*Operation-open circuit starting*

Under open circuit starting conditions, when there is no arc at the electrode 5 and the electrode is cold, the alternating current potential between the line 3 and ground is substantially sinusoidal. A portion of that potential is translated through transformer 23 and appears across resistor 29 and hence between junctions 22 and 30. This portion of that potential may be that illustrated in FIG. 2 at 67.

The cathode 18c of thyratron 18 is connected directly to ground. The control electrode 18b has three component potentials applied to it, one of them being the potential 67 of FIG. 2. The full wave rectifier including diodes 64 and 65 is effective to supply to junctions 30 a negative biasing potential which has a substantially constant value. This constant value is indicated at 68 in FIG. 2 and tends to shift the thyratron tripping points on the curve 67 from its intersections with the zero axis to its intersections with the dotted line 69.

Figure 2:
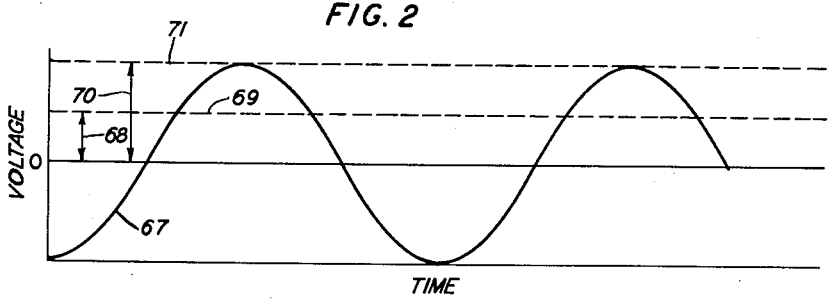
FIG. 2 is a graphical illustration of potential variations during open circuit (cold electrode) conditions.

The secondary winding 33 and rectifier 34 are effective at this time to supply to the junction 30 a further biasing potential, indicated by the reference numeral 70 in FIG. 2, whose value may be adjusted by means of variable resistor 35. This potential charges the capacitor 32 and holds the control electrode 18b at a potential such that it can trip the thyratron only at or near the positive peaks of the A.C. wave 67, i.e., when the values of those positive peaks exceed the potential value indicated by the dotted line 71 in FIG. 2.

*Operation during welding*

Figure 3:
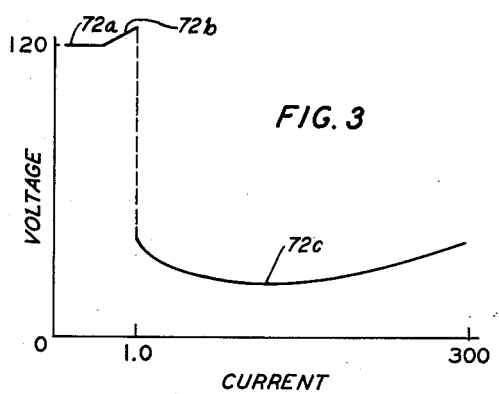
FIG. 3 is a graphical illustration of the current-potential characteristics of a typical arc welding gap.

FIG. 3 illustrates a typical current potential characteristic of an arc welding gap. With a cold cathode, a high voltage fall is needed to initiate first a glow discharge 72a and then an abnormal glow discharge 72b which is unstable and instantly transfers to an arc discharge at 72c. In FIG. 3 the current value axis has been distorted to show more clearly the glow characteristic portions of the curve which would generally occur at current values less than 1 ampere. Once the arc has been started residual thermionic emission will aid reignition. If, as with a thermionic material such as tungsten, the residual thermionic material such as tungsten, the residual thermionic emission is in excess of the glow-to-arc transition current, no reignition would be required.

Figure 4:
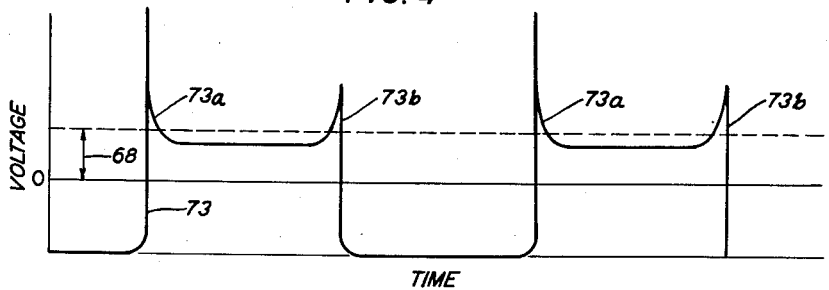
FIG. 4 is a graphical illustration similar to FIG. 2, but showing the potential variation under arc welding conditions.

FIG. 4 shows at 73 the variation with time of the potential between the electrode and the workpiece during welding with an alternating current arc. It is assumed that the electrode is thermionic and that the workpiece comprises a material having poor electron emission characteristics. During the negative half cycles, when the electrode is emitting electrons, the wave is generally square. During the positive half cycle, when the workpiece must emit electrons, the glow potential characteristic of the material is reflected by the presence of peaks 73a at the beginning of each half cycle and peaks 73b at the end or trailing edge of each half cycle. In other words, when the current is low, just after it has passed through zero or is approaching zero, the potential across the arc rises to peak values.

The potential supplied to the transformer 23 at this time is smaller than the potential indicated by the sine wave 67 in FIG. 2, because of the load on the generator represented by the arc at the electrode 5. Consequently, the negative biasing potential supplied by secondary winding 33 and rectifier bridge 34 is smaller than the value indicated at 70 in FIG. 2, having a value less than the bias supplied through the diodes 64 and 65 which remains the same as in FIG. 2, being shown at 68 in both FIGS. 2 and 4.

Under these conditions, the wave 73, representing the potential across the arc, may overcome the bias 68 and trip the thyratron 18 at either the leading edge peak 73a or the trailing edge peak 73b. It is desirable to have the thyratron trip on each of the peaks 73a. It is also desirable that the thyratron must not trip on the peaks 73b. For one thing, the ionizing potential of high frequency at such times is practically useless, and would contribute only to the radio interference. For another thing, the timing of the charging of capacitor 16 is preferably related to the length of one cycle of the alternating current supplied by alternator 1. The capacitor 16 should charge in somewhat less than one complete cycle. Consequently, if the thyratron 18 is permitted to trip at the peak 73b, the capacitor 16 may not be fully charged by the time the next peak 73a comes along, and consequently, there may not be a sufficiently high potential on the capacitor 16 to produce a high frequency pulse effective to ionize the arc.

Figure 5:
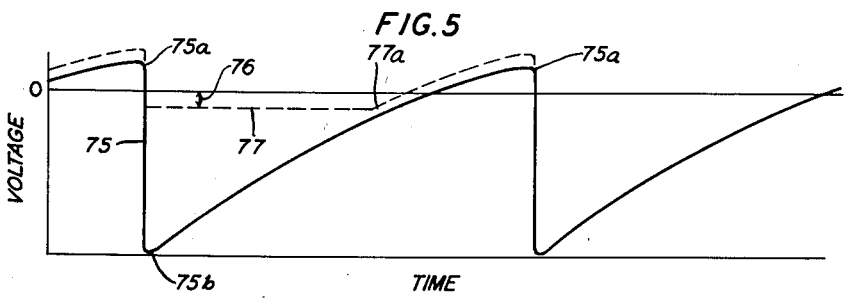
FIG. 5 is a graphical illustration of certain potentials in the circuit during operation of the apparatus.

There is shown at 75 in FIG. 5 a curve representing the variation in potential at the junction between capacitor 41 and resistor 40 as capacitor 16 is charged by its charging circuit and discharged through the thyratron 18. The curve illustrated represents steady operating conditions, and does not illustrate the transient conditions which occur after the relay contact 44a is first closed.

As capacitor 16 charges to a peak value of potential, capacitor 41 is charged through resistor 42 and diode 43 until the junction point between capacitor 41 and resistor 42 attains a positive peak potential indicated at 75a. When the thyratron breaks down, as by the application of the peak potential 73a to its control electrode 18b, the capacitor 16 discharges through transformer primary winding 15, choke coil 17 and the thyratron 18. The capacitor 16 is thus discharging through a series resonant circuit. Consequently, the potential on capacitor 16 changes from a positive peak value to a slightly negative value and the junction point between capacitor 41 and resistor 40 follows this potential change to a negative peak value shown at 75b in FIG. 5. This negative potential is applied to neon tube 39 through resistor 40 and the neon tube breaks down and becomes conductive at the potential 76 in FIG. 5.

After the neon tube 39 is illuminated, the potential across it remains at the value indicated at 76, following the dotted curve 77 in FIG. 5, until the capacitor 16 is recharged sufficiently so that the potential passing through coupling capacitor 41 swings more positive than the negative value 76. This change takes place at 77a in FIG. 5.

Shortly thereafter, the neon tube 39 becomes extinguished, and the capacitor 16 continues to recharge toward its positive peak value and swings the junction point between capacitor 41 and resistor 40 toward its positive peak value 75a again.

Note that at the time when the trailing edge peaks 73b occur, the neon tube 39 is illuminated and the diode 38 is forwardly biased, so that diode 38 and tube 39 together form a low impedance shunt to the positive peak 73b, which is thereby prevented from reaching the control electrode 18b and tripping the thyratron 18.

While we have shown and described a preferred embodiment of our invention, modifications thereof will readily occur to those skilled in the art, and we therefore intend our invention to be limited only by the appended claims.

We claim:

1. Arc initiating mechanism for alternating current welding apparatus, comprising conductors for supplying low frequency alternating electrical energy to an electrode and a workpiece separated by an arc welding gap, a high frequency spark generator connected to said conductors for producing a gap ionizing spark between the electrode and the workpiece, means for energizing the spark generator intermittently including spark energy supply means and means for triggering the release of energy from the spark energy supply means, said triggering means including biasing means inhibiting the release of energy, means responsive to the potential of the low frequency alternating electrical energy in said conductors and effective to override the biasing means only during the low frequency half-cycles when the electrode is positive, and means responsive to the amplitude of the potential of the low frequency alternating electrical energy in said conductors and effective to further bias said triggering means against the release of energy, said amplitude responsive means having a substantially greater biasing effect when the electrode is cold and there is no alternating load current flow in said conductors, said biasing means, said potential responsive means and said amplitude responsive means being proportioned so that at such times the release of spark energy is inhibited except at the peaks of said positive electrode half-cycles.

2. Arc initiating mechanism as defined in claim 1, in which said triggering means comprises a thyratron device having input, output and common electrodes, and said biasing means comprises a source of electrical energy independent of said low frequency alternating electrical energy supplied to said conductors and of said spark energy supply means, means for deriving a constant biasing potential from said independent source, and means connecting said potential between said input and common electrodes of the thyratron device.

3. Arc initiating mechanism as defined in claim 1, in which said triggering means comprises a thyratron device having input, output and common electrodes and said potential responsive means comprises a transformer having primary and secondary windings, means connecting the primary winding between the welding electrode and the workpiece and means connecting the secondary winding between the input and common electrodes of the thyratron device.

4. Arc initiating mechanism as defined in claim 3, in which said amplitude responsive means comprises a second secondary winding on the transformer, and a rectifier having input terminals connected to said second secondary winding and output terminals connected between the input and common terminals of the thyratron device.

5. Arc initiating mechanism as defined in claim 1 in which: said spark generator comprises a transformer having primary and secondary windings, a capacitor connected in parallel with the secondary winding and cooperating therewith to form a high frequency resonant circuit, and means connecting the secondary winding to the welding electrode and the workpiece; said triggering means comprises a thyratron device having input, output and common electrodes and means connecting the output and common electrodes in series with the spark energy supply means; said spark energy supply means comprises a capacitor, means for charging said capacitor including a source of alternating electrical energy independent of said low frequency alternating electrical energy supplied to said conductors, and a first rectifier having input terminals connected to said source and output terminals connected to said capacitor; said biasing means comprises a second rectifier having input terminals connected to said source and output terminals connected respectively to the input and common electrodes of the thyratron device; said potential responsive means comprises a second transformer having primary and secondary windings, means connecting the primary winding between the welding electrode and the workpiece, and means connecting the secondary winding between the input and common electrodes of the thyratron device; and said amplitude responsive means comprises a second secondary winding on the second transformer, a third rectifier having input terminals connected to the second secondary winding and output terminals connected to the input and common terminals of the thyratron device.

6. Arc initiating mechanism for alternating current welding apparatus, comprising conductors for supplying low frequency alternating electrical energy to an electrode and a workpiece separated by an arc welding gap, said alternating electrical energy having during welding a potential wave form characterized by peaks at the leading and trailing edges of each half-cycle, a high frequency spark generator connected to the electrode and the workpiece for producing a gap ionizing spark between the electrode and the workpiece, means for energizing the spark generator intermittently including spark energy supply means and means for triggering the release of energy from the spark energy supply means, said triggering means including biasing means inhibiting the release of energy, means responsive to the potential between the electrode and the workpiece and effective to override the biasing means only during the low-frequency half cycles when the electrode is positive, and means operable after each release of energy from the spark energy supply means to disable the potential responsive means for a period of time greater than one half-cycle so that the triggering means cannot be actuated by the trailing edge peaks.

7. Arc initiating mechanism as defined in claim 6, in which said triggering means comprises a thyratron device having input, output and common electrodes, and means connecting the output and common electrodes in series with the spark energy supply means; said disabling means comprises a diode and a neon tube connected in series between the input and common electrodes of the thyratron device, said diode being poled to pass current in response to a potential of triggering polarity, and means responsive to tripping of the triggering means to apply to the neon tube a potential of said polarity and of sufficient amplitude to break down the tube, said tube and diode then cooperating to shunt triggering potentials from said input electrode.

8. Arc initiating mechanism as defined in claim 7, in which said spark energy supply means comprises a capacitor and means for charging the capacitor to an operating potential in a time substantially equal to one period of the low frequency alternating electrical energy; said connecting means comprises inductive means effective after each discharge of the capacitor through the thyratron device to swing the capacitor potential in a sense reversed with respect to the sense of the charging means, and means coupling said capacitor potential to said disabling means.

9. Arc initiating mechanism as defined in claim 8, in which said disabling means comprises a network including said diode and said neon tube, a first resistor having one terminal connected to the junction between the diode and the neon tube, a second diode and a second resistor connected in series between said common electrode of said thyratron device and the other terminal of the first resistor; and said coupling means comprises a second capacitor having one terminal connected to said first-mentioned capacitor and another terminal connected to the common terminal of the first and second resistors.

10. Arc initiating mechanism for alternating current welding apparatus, comprising conductors for supplying low frequency alternating electrical energy to an electrode and a workpiece separated by an arc welding gap, said alternating electrical energy having during welding a potential wave form which may be characterized by peaks at the leading and trailing edges of each half-cycle during which the electrode is positive, a high frequency spark generator connected to the electrode and the workpiece for producing a gap ionizing spark between the electrode and the workpiece, means for energizing the spark generator intermittently including spark energy supply means and means for triggering the release of energy from the spark energy supply means, said triggering means including biasing means inhibiting the release of energy, means responsive to the potential between the electrode and the workpiece and effective to override the biasing means only during the low-frequency half cycles when the electrode is positive, means operable after each release of energy from the spark energy supply means to disable the potential responsive means for a period of time greater than one half-cycle so that the triggering means cannot be actuated by the trailing edge peaks, and means responsive to the average amplitude of the potential of the alternating electrical energy supplied to said conductors and effective to further bias said triggering means against the release of energy, said amplitude responsive means having a substantially greater biasing effect when the electrode is cold and there is no alternating load current flow in said conductors, said biasing means, said potential responsive means and said amplitude responsive means being proportioned so that at such times the release of spark energy is inhibited except at the peaks of said positive electrode half-cycles.

11. Arc initiating mechanism for alternating current welding apparatus, comprising conductors for supplying low frequency alternating electrical energy to an electrode and a workpiece separated by an arc welding gap, a high frequency spark generator connected to the electrode and the workpiece for producing a gap ionizing spark between the electrode and the workpiece, means for energizing the spark generator intermittently including spark energy supply means and means for triggering the release of energy from the spark energy supply means only at peaks of the half cycles of the low frequency alternating potential between said conductors and only when the welding electrode is positive.

12. Arc initiating mechanism for alternating current welding apparatus, comprising conductors for supplying low frequency alternating electrical energy to an electrode and a workpiece separated by an arc welding gap, said alternating electrical energy having a substantially sinusoidal open circuit potential wave form, and a potential wave form during welding which may be characterized by peaks at the leading and trailing edges of each half cycle during which the electrode is positive, a high frequency spark generator connected to the electrode and the workpiece for producing a gap ionizing spark between the electrode and the workpiece, means for energizing the spark generator intermittently including spark energy supply means and means for triggering the release of energy from the spark energy supply means, only at the peaks of positive electrode half cycles of the sinusoidal wave form on open circuit and only at said leading edge peaks during welding.

13. A method of alternating current arc welding, comprising supplying between a welding electrode and a workpiece an alternating potential having a generally sinusoidal wave form in the absence of a welding arc and a wave form, during welding, characterized by leading and trailing edge peaks during the half cycles when the electrode is positive, and supplying a relatively high frequency, gap ionizing potential between the electrode and the workpiece only at the peaks of the positive electrode half cycles of the sinusoidal wave form on open circuit and only at said leading edge peaks during welding.

References Cited in the file of this patent

UNITED STATES PATENTS

| | | |
|---|---|---|
| 2,629,071 | Anderson | Feb. 17, 1953 |
| 2,659,036 | Needham et al. | Nov. 10, 1953 |